July 3, 1951  A. CRESSWELL  2,558,731
METHOD OF PRODUCING SYNTHETIC FIBERS FROM
POLYMERS AND COPOLYMERS OF ACRYLONITRILE
Filed Jan. 27, 1949  2 Sheets-Sheet 1

INVENTOR
ARTHUR CRESSWELL,
BY
Harold L. Kauffman
ATTORNEY

Patented July 3, 1951

2,558,731

UNITED STATES PATENT OFFICE 2,558,731

METHOD OF PRODUCING SYNTHETIC FIBERS FROM POLYMERS AND COPOLYMERS OF ACRYLONITRILE

Arthur Cresswell, Stamford, Conn., assignor to American Cyanamid Company, New York, N. Y., a corporation of Maine Application January 27, 1949, Serial No. 73,078

21 Claims. (Cl. 18—54)

This application is a continuation-in-part of my copending application Serial No. 68,370, filed December 30, 1948, now abandoned.

This invention relates to the preparation of synthetic fibers from polymers and copolymers of acrylonitrile. More particularly it is concerned with certain new and useful improvements in a method of producing fibers (including both monofilaments and multifilaments) from a soluble, thermoplastic product of polymerization of a polymerizable mass comprising mainly acrylonitrile.

Various methods of producing filaments, films and other shaped articles from acrylonitrile (polymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metallic) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in my copending application Serial No. 772,200, filed September 4, 1947, is based on my discovery that useful films, filaments, threads and other shaped articles, which are capable of being dyed, can be produced from acrylonitrile polymerization products of the kind described broadly in the second paragraph of this specification, and more specifically in the aforementioned patents as well as hereinafter, by precipitating or coagulating the polymerization product in approximately its desired shape from a water-coagulable solution thereof (e. g., concentrated aqueous salt solutions of the kind disclosed by Rein in his Patent No. 2,140,921), the precipitation being effected by contacting the said solution with a cold liquid coagulant comprising water, more particularly such a coagulant which is at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below +10° C., e. g., within the range of —15° C. to +10° C. and preferably at from about —15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The invention disclosed and claimed in my aforementioned copending application Serial No. 772,200 is based on my further discovery that the shaped, precipitated gels, e. g., extruded, water-swollen monofilaments and multifilaments, which may be collectively designated as yarns or fibers, and which have been formed in a cold liquid coagulant comprising water at a low temperature of the order of that mentioned in the preceding paragraph, can be materially improved in properties by subjecting the precipitated material in wet, swollen state to tension, as by stretching, in contact with moisture or water and at an elevated temperature, specifically at a temperature within the range of about 70° C. to about 110° C. Advantageously water at 70° C. to 100° C., preferably at 90° C. to 100° C., is the fluid medium with which the gelled or precipitated fiber or other product is contacted during the stretching operation, but if temperatures above 100° C., e. g., 110° C., are desirable, then an atmosphere of saturated steam may be employed. For optimum results during stretching it is important that moisture or water be present. By thus wet stretching the precipitated product, more particularly to an extent at least twice its original length (that is, at least 100%) and preferably from 3 to 20 or 30 or more times its original length, the molecules are oriented along the fiber axis and a product having increased tensile strength, pronounced fibrillation, toughness, resilience and other improved properties is obtained.

The present invention is concerned with certain new and useful improvements in the process of producing yarns or fibers from polymers and copolymers of acrylonitrile as disclosed and claimed in my aforementioned copending application Serial No. 772,200 and more particularly, in accordance with one embodiment of the invention, to an improved process whereby the stretched, water-swollen or aquagel fiber of the acrylonitrile polymerization product can be continuously dried, or, preferably, both continuously spun, stretched and dried whereby a fiber or thread is obtained more quickly and with a minimum of handling so that the product is more uniform and is less subject to damage during processing than, for example, a package-spun fiber or thread. Specifically, one embodiment of the invention is directed to a new and improved method of producing a synthetic fiber from a soluble, thermoplastic product of polymerization of a polymerizable mass comprising mainly acrylonitrile, which method comprises extruding the said polymerization product in the form of a fiber from a water-coagulable solution thereof and immediately after extrusion contacting the extruded mass with a liquid coagulant comprising water, the said coagulant being at a temperature not exceeding +10° C., thereby to precipitate the said product from the said solution as a stretchable gel; stretching the said gel in the presence of moisture and at a temperature within the range of about 70° C. to about 110° C.; applying a liquid (volatile liquid) composition, more particularly an aqueous dispersion, containing an anti-static agent (e. g., a guanylurea or a guanidine salt of a mono-aliphatic hydrocarbon ester of sulfuric acid, more particularly such a salt wherein the aliphatic hydrocarbon grouping contains from 12 to 16 carbon atoms, inclusive) to the stretched gel, that is, to the stretched fiber in gel state; and continuously drying the resulting gelled fiber while it is moving in a helical path, more particularly by causing the gelled fiber to move in a helical path in contact with a surface, specifically a smooth, rotating surface (e. g., a polished, stainless steel surface), at least a portion of which surface is heated to a temperature sufficiently high to dry the said fiber either substantially completely or to a desired degree. It is important that the gelled fiber be treated with an anti-static agent prior to drying, since otherwise the accumulation of static electricity on the dried fibers causes or tends to cause filament "ballooning" and makes it extremely difficult, if not impossible, to dry the wet, gelled fibers continuously with a degree of success that would meet practical operating requirements on a commercial scale.

Another embodiment of the present invention consists in the step of stretching the gelled fiber of acrylonitrile polymerization product in the presence of moisture, at a temperature within the range of about 70° C. to about 100° C. and, also, while it is in a line which is tangent to two rotating circular surfaces and between which there is no other point of solid, frictional contact, the peripheral speed of one of the said rotating surfaces being greater than that of the other thereby to maintain the gelled fiber under tension. Among the advantages of this particular step in the production of a synthetic fiber from a water-coagulable solution of an acrylonitrile polymerization product may be mentioned the following:

The thread, during its stretching operation, may be subject to mechanical damage, i. e., filament breakage, abrasion, etc., as it comes in frictional contact with such devices as hooks, rollers or sheaves, which conventionally are used to submerge a thread in a bath. In accordance with the present invention such defects are obviated by using apparatus in carrying out the process which is so designed that there is no frictional contact on the thread during the critical stretching operation whereby the gelled fiber is oriented along the fiber axis.

Another novel feature of the present invention involves the step of applying to the gelled fiber (that is, after coagulation of the solution containing the polymeric or copolymeric acrylonitrile in a bath of a cold liquid coagulant comprising water) a cold liquid treating agent comprising water while the said gelled fiber is moving in a helical path. This liquid treating agent likewise should be at a temperature not exceeding +10° C., for example at a temperature within the range of −15° C. to +10° C., and preferably at a temperature of about 0° C. to about +5° C. This cold liquid treating agent, which is preferably composed of water at a low temperature such as has been mentioned before, is advantageously applied to the gelled fiber while the fiber is moving in a helical path in contact with a smooth rotating surface which likewise is at a temperature not exceeding +10° C. The rotating surface may take the form of a pair of cylindrical rolls upon which helices of the gelled fiber advance from the feed-on end to the take-off end. These rolls advantageously may be tilted at a suitable angle, for instance, at an angle of about 2° to about 10°, e. g., about 5°, and the liquid treating agent applied at the take-off end of one or both of the rolls whereby the fiber is countercurrently treated or washed with the treating or washing agent. By the application of, for example, cold water to advancing helices of the gelled fiber, any traces of water-soluble impurities which may be present in the fiber or on its exterior surfaces, such, for example, as traces of salts, solutions of which may have been used in dissolving the acrylonitrile polymerization product, will be removed from the gelled fiber prior to the stretching operation. The removal of traces of such water-soluble impurities is advantageous in that it permits optimum stretching of the gelled fiber with resulting improvement in the properties of the final product.

The final step of the process comprises drying the stretched fiber. This may be done by conventional methods such as by drying at room temperature on a bobbin or other device on which the gelled fiber may have been collected; or drying may be effected continuously by the use of heated, convergent rolls such as are described in my aforementioned copending application Serial No. 68,370, now abandoned, and in copending application Serial No. 146,880, filed February 28, 1950, as a division of said application Serial No. 68,370. As is disclosed in those copending applications, such a continuous drying operation comprises continuously drying the stretched gelled fiber, to which previously has been applied an aqueous composition containing an anti-static agent, by causing the fiber to move in a helical path, more particularly while it is in contact with a surface at least a portion of which is heated to a temperature sufficiently high to dry the fiber.

The novel features which are characteristic of my invention are set forth in the appended claims. The invention itself, however, will best be understood by reference to the following more detailed description when considered in connection with the accompanying drawing in which

In carrying my invention into effect a polymer or copolymer of acrylonitrile is first prepared in accordance with methods now well known to those skilled in the art. In the preparation of copolymers a mixture of monomers comprising mainly, that is, a preponderant proportion by weight of, acrylonitrile is employed, and preferably the acrylonitrile constitutes at least about 50% by weight of the mixture of monomers. If less than about 50% by weight of acrylonitrile be present in the mixture of monomers, the full advantages of the invention are not obtained when processing the resulting copolymer in accordance with the invention. The monomeric mixture therefore should contain substantially more than 50% by weight of acrylonitrile, e. g., from 55 to 99.5% by weight of acrylonitrile. Illustrative examples of monomers which may be copolymerized with acrylonitrile in proportions such as have been mentioned above to form a copolymer, more particularly a thermoplastic copolymer, are compounds containing a single $CH_2=C<$ grouping, for instance the vinyl esters and especially the vinyl esters of saturated aliphatic monocarboxylic acid, e. g., vinyl acetate, vinyl propionate, vinyl butyrate, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; and numerous other vinyl, acrylic and other compounds which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

A suitable method of polymerizing the monomeric acrylonitrile or mixture of monomers is in an aqueous emulsion using a suitable polymerization catalyst, e. g., ammonium persulfate. Other polymerization methods, however, also may be employed, e. g., methods such as those described in Bauer et al. U. S. Patent No. 2,160,054. The polymeric or copolymeric acrylonitrile may be of any suitable molecular weight, but ordinarily it will be within the range of 15,000 to 300,000 or higher, as calculated from viscosity measurements using the Staudinger equation (reference: U. S. Patent No. 2,404,713).

The polymeric or copolymeric acrylonitrile is then dissolved in a solvent from which the polymer (or copolymer) is precipitated or coagulated when the solution is brought into contact (e. g., immediately after extrusion) with a liquid coagulant comprising water, more particularly water which is at a temperature not exceeding substantially +10° C., preferably at or below +5° C., e. g., at from —10° C. to +5° C. Examples of such solvents are concentrated aqueous solutions of water-soluble inorganic salts, more particularly such salts which yield highly hydrated ions in aqueous solution, e. g., the chlorides, bromides, iodides, thiocyanates, perchlorates and nitrates, which salts are disclosed in the aforementioned Rein Patent No. 2,140,921 and the concentrated aqueous solutions of which are the preferred solvents for the acrylonitrile polymerization product, more particularly such a product containing in the molecules thereof an average of at least about 85% by weight of combined acrylonitrile, in carrying the present invention into effect. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono- (lower alkyl)-substituted guanidine thiocyanates and the symmetrical and unsymmetrical di-(lower alkyl)-substituted guanidine thiocyanates. These solutions containing dissolved polymeric or copolymeric acrylonitrile are more fully described and are specifically claimed in my copending application Serial No. 772,201, filed September 4, 1947, now Patent No. 2,533,224 issued December 12, 1950.

In practicing the present invention it is important that the bath in which the solution of the polymeric or copolymeric acrylonitrile is coagulated be at a temperature not exceeding substantially +10° C., and preferably at or below +5° C., e. g., —10° C. to 0° C. or +1° or +2° C. Temperatures below —15° C., e. g., —20° C. or lower, may be employed if desired, but such temperatures are more costly to secure and maintain, and no particular advantages appear to accrue therefrom. By the use of a low-temperature, aqueous coagulating bath as herein described, the shaped, coagulated or precipitated material, more particularly an extruded, water-swollen or gelled fiber or thread, is clear (transparent) or substantially clear, cohesive, has considerable elasticity and toughness, and is capable of being oriented, e. g., by stretching. In marked contrast, when the aqueous coagulating bath is substantially above +10° C., e. g., +20° C. or +25° C. or higher, the resulting fiber or thread usually either is opaque or shows considerable haze, is spongy and has little or no mechanical strength. Furthermore, it is either unstretchable or has a low order of stretchability, yielding on drying a brittle fiber or thread which cannot be used for textile purposes.

Furthermore, when multifilaments are produced with the aid of a low-temperature coagulating bath as herein described, the individual water-swollen or gelled filaments show no tendency to stick together. This was quite surprising and unexpected, as was also the fact that the swollen or gelled products could be washed substantially free of salt without difficulty, even in a cold coagulating bath, especially in view of the fact that these discoveries are directly contrary to the prior art teachings. For example, in Patent No. 2,404,716 and in numerous other patents it is stated that it has been found substantially impossible to use the solutions proposed in Rein Patent No. 2,140,921 in the production of yarns and films, and that their extrusion into coagulating baths, including such non-solvents for polyacrylonitrile as water, dilute acid solutions, dilute salt solutions, etc., results in the formation of shaped articles that contain large amounts of the inorganic salt component of the solvent. The prior art also teaches that these salts are distributed throughout the structure, that the latter possesses poor physical properties and that the removal of these salts, when possible, results in the formation of a porous, spongy, weak, undesirable structure that is very brittle and completely unsuited for use as a yarn or film. The prior art further teaches that when an attempt is made to form a multifilament yarn by extruding an aqueous sodium sulfocyanide (sodium thiocyanate) polyacrylonitrile composition into a dilute acid bath, the individual filaments that are obtained stick together to form an essentially monofilament structure which is extremely brittle and cannot be bent or worked without breaking. In marked contrast the synthetic fibers obtained by practicing the present invention are substantially free from salts, are tough and ductile even when first coagulated in the spinning or precipitating bath, and the individual filaments show no tendency to stick together when extruded through a spinneret into the cold aqueous bath.

In carrying the present invention into effect the spun fibers are treated after leaving the coagulating bath in order to orient the molecules and thereby to increase the tensile strength and otherwise to improve the properties of the spun material. In accordance with the instant invention orientation is effected by stretching the fiber, while still in its water-swollen or gel state, in the presence of moisture, at a temperature within the range of about 70° C. to about 100° C., more particularly at a temperature of about 90° C. to about 100° C., and while it is in a line which is tangent to two rotating circular surfaces and between which there is no other point of solid, frictional contact. This stretching may be effected, for example, as illustrated in Fig. 1 of the drawing accompanying my copending applications Serial Nos. 68,370, now abandoned and 146,880, and also as shown in the various figures of the drawing accompanying the present application.

Figure 1:
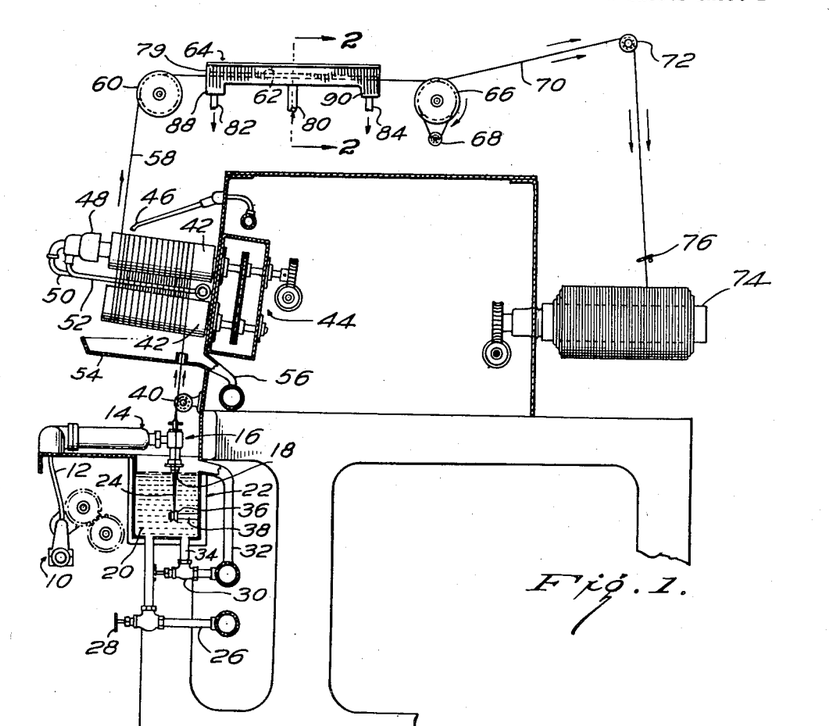
Fig. 1 is a somewhat diagrammatic side view, partly in section, of one form of apparatus that may be used in practicing the invention, and illustrative thereof.
Figure 2:
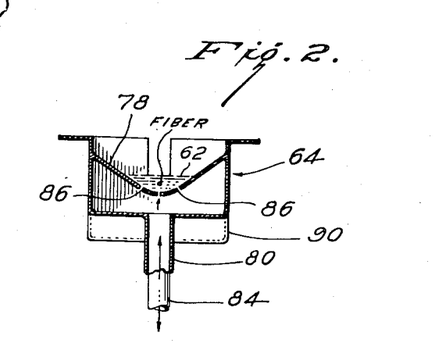
Fig. 2 is a transverse sectional view along the line 2—2 of a portion of the apparatus shown in Fig. 1.

With reference to the accompanying drawing and more particularly to Fig. 1 thereof, a water-coagulable solution of the polymeric or copolymeric acrylonitrile, which has been filtered (if necessary) and de-aerated, is supplied by a manifold pipe to a metering pump 10, which forces the solution through the conduit 12 and thence through the candle filter 14 to the vertically positioned spinneret coupling or heading 16. This spinneret coupling preferably is designed so that the solution can be heated, e. g., by electrical, hot water, steam or other means, prior to extrusion through the spinneret 18. A suitable design of a spinneret coupling, which is heated by electrical means, is shown in Fig. 2 of the drawing accompanying my aforementioned copending application Serial No. 772,200. The device there illustrated comprises a male coupling in which is annularly spaced an electrically heated cartridge provided with lead-in wires. This cartridge advantageously may be fitted in the male coupling by means of a liquid-tight plug. The electrically heated cartridge is so positioned as to project beyond the lower end of the male coupling and into the cup of the spinneret which is attached by means of a female coupling. With such a device the solution being charged through the conduit leading into the spinneret heading passes annularly between the outer wall of the cartridge and the inner wall of the male coupling and thence into the spinneret 18. Since such an electrically heated cartridge projects into the cup of the spinneret, the solution is maintained at an elevated temperature prior to extrusion. The temperature of the solution may be varied as desired or as conditions may require, but ordinarily will be within the range of about 60° C. to about 100° C. By heating the solution immediately prior to extrusion, its viscosity is materially reduced and a substantial reduction in operating pressure is effected. Furthermore, by increasing the fluidity of the solution at the point of extrusion, the water-swollen or gelled filaments can be pulled from the spinneret at a greater speed, thereby increasing the amount of fiber or yarn that can be produced from a particular unit.

Instead of using an electrically heated cartridge as above briefly described, the solution entering the spinneret coupling 16 may be preheated by a steam-heated inner tube around which the solution flows annularly, thereby to reduce the viscosity of the spinning solution at the point of extrusion. Such a steam-heated inner tube is employed in preheating the spinning solution which enters the spinneret coupling forming a part of the apparatus shown by way of illustration in Fig. 1.

Figure 3:
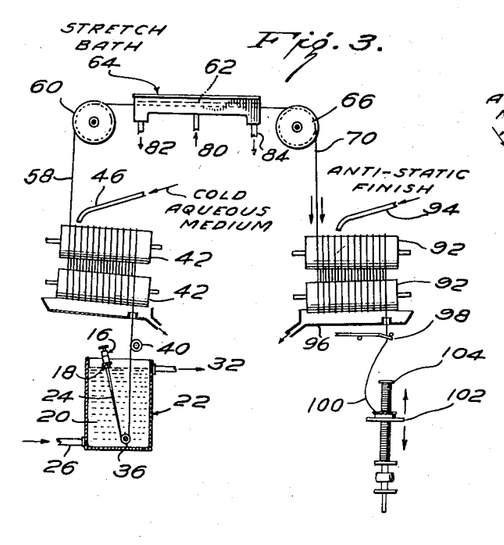
Fig. 3 also is a somewhat diagrammatic side view, partly in section, of another and preferred form of apparatus that may be employed in practicing the present invention.

The spinneret coupling 16 may be held by any suitable means, for example by being attached to the delivery end of the filter 14, above the cold aqueous coagulating or precipitating bath 20 in vessel 22 at any convenient angle. For instance, the spinneret coupling may be positioned at less than a 90° angle to the surface of the aqueous coagulating bath 20 as shown in Fig. 3 of the drawing accompanying the present application or at approximately a 90° angle to the surface of the said bath as shown in Fig. 1 of the aforesaid drawing. The coupling preferably is positioned so that only the face of the spinneret contacts the coagulating bath.

As the solution is forced under pressure through the openings in the spinneret, it coagulates or precipitates in the form of solid, water-swollen or gelled filaments or fiber 24 upon entering the coagulating bath 20, which is maintained at a temperature not exceeding substantially +10° C. by any suitable means. For example, water may be refrigerated or cooled to the desired low temperature and circulated through the vessel 22. Such refrigerated water may be introduced into vessel 22 through supply line 26 upon opening valve 28. Valve 30 is closed when charging a refrigerated liquid coagulant comprising water to vessel 22 in order to fill the latter. The overflow of cold liquid coagulant from vessel 22 flows from the top of the vessel through conduit 32, and, if desired, may be returned to the vessel through conduit 34 by opening valve 30; or, it may be returned to the refrigeration system for further refrigeration and recirculation through vessel 22; or, it may be led to an evaporating system for concentration and reuse as a solvent in dissolving the acrylonitrile polymerization product.

Alternatively, and as shown in Fig. 1 of the drawing accompanying my aforementioned copending application Serial No. 772,200, cooling coils through which is circulated a liquid coolant, e. g., a refrigerated brine solution, may be employed to maintain the bath 20 at the desired low temperature. It will be understood, of course, that various other means may be used to keep the bath 20 at or below $+10°$ C. For instance, instead of employing means such as mentioned above, I may add ice alone to the bath, or a mixture of ice and sodium chloride or other salt, or ice and methyl or ethyl alcohol, or other suitable temperature depressants or mixtures thereof in order to reduce the bath of liquid coagulant comprising mainly water to the desired low temperature.

The coagulating fiber in gel state is led through the bath 20, which preferably is of the circulating type, by any suitable means. In the embodiment of the invention shown in Fig. 1, the water-swollen or gelled fiber 24 is led downwardly to a submerged roller 36, which may be positively driven, and thence to the surface. This roller may be conveniently mounted on a removable bracket 38 for ease in changing rollers.

Upon emerging from the coagulating bath 20 the fiber 24 passes over a guide roller 40 and thence to a pair of converging hollow drums or rolls 42. These rolls are positively driven by a suitable driving mechanism 44 and are suitably spaced from each other, e. g., 6 or 8 inches or more. They are suspended in the same vertical plane and are caused to rotate at the same peripheral speed. The rolls are slightly inclined (i. e., converge) toward each other at the delivery end, thereby to advance the thread over the rolls. The degree of convergency may be varied as desired or as conditions may require in order to advance the thread in a plurality of helices over the rolls. Either one or both rolls may converge slightly toward each other, the degree of convergency being shown in an exaggerated manner in both Figs. 1 and 3. With rolls 4 inches in diameter and 10 inches long, satisfactory results ordinarily are obtained by having the lower roll convergent to the upper roll, at the delivery end, by an angle of about 0.6°. The diameter and length of the rolls may be varied as desired or as conditions may require, but ordinarily they are such that, during operation, the length of thread being washed with cold liquid treating agent comprising water while the said thread is continuously moving in a helical path is from about 5 yards to about 40 yards.

If desired, both rolls may be tilted at a suitable angle to the horizontal, e. g., at an angle of about 2° to 10°, more particularly at an angle of about 5°, to the horizontal. By tilting the rolls at a substantial angle to the horizontal, the thread advancing along the rolls from the feed-on end to the take-off end meets a countercurrent stream of the cold liquid treating agent comprising mainly water, e. g., water itself, at a temperature not higher than $+10°$ C. and preferably at a temperature within the range of about 0° C. to $+5°$ C. This cold liquid treating agent is applied to the advancing helices of thread or fiber from the jet 46.

To prevent the ice water or other cold liquid coagulant comprising water from warming up excessively as it runs along the surfaces of the rolls, a suitable refrigerant advantageously may be introduced into either one or both of the hollow cylinders or rolls 42, thereby to maintain the exterior surface of the roll in contact with the thread at a temperature not higher than $+10°$ C., more particularly within the range of about $-15°$ C. to about 0° or $+5°$ C. This refrigerant may be, for example, chilled brine, which is circulated through either one or both rolls through rotary joint 48, the brine entering the roll through conduit 50 and being discharged through conduit 52. In the embodiment of the invention shown in Fig. 1 the upper roll only is shown as being provided with means for introducing a chilled brine solution in order to keep the temperature of the roll itself at the desired low point. The wash water or other liquid treating agent comprising mainly water which is applied to the advancing helices of fiber in this manner drips off the rolls into a collector tray or basin 54, which is positioned immediately below the rolls, and from which the liquid flows into a return line 56 and thence, for example, back to coagulating bath 20 (after being refrigerated if necessary) or to a suitable recovery system.

As has been mentioned hereinbefore, the application of cold water to advancing helices of the gelled fiber facilitates the removal of traces of any water-soluble impurities which may be present in the gelled structure or on the exterior surface of the fiber. By using treating rolls such as shown in Fig. 1 and applying cold water or other cold liquid treating agent comprising water to advancing helices of the fiber, any traces of salt that may be present are removed from the fiber prior to the stretching operation. This is advantageous in that it permits optimum stretching of the gelled fiber with a resulting marked improvement in the properties of the gelled product.

In some cases, however, it may not be necessary or desirable to use treating rolls such as illustrated in Fig. 1. In such instances, the gelled fiber may be led through the bath 20 merely with the aid of a guide roll or sheave to facilitate the passage of the fiber through the coagulating bath as is shown in Fig. 1 of the drawing accompanying my aforementioned copending application Serial No. 772,200. Or, the gelled fiber may be led through the bath 20 with the aid of a submerged, power-driven godet and multigroove roll as is shown in Figs. 1, 8 and 9 of my copending applications Serial Nos. 68,370, now abandoned and 146,880. The latter arrangement permits a long bath travel by multiple winds of synthetic fiber without excessive tension on the fiber, such as may occur when a pair of multigroove rolls alone is used in leading the fiber through the bath. In such cases the gelled fiber is then stretched in the manner described briefly hereinbefore and more fully later herein.

With further reference to Fig. 1 the washed, gelled thread or fiber 58 is led from the discharge end of the converging rolls 42 to a godet 60 which has the same surface speed as that of the converging rolls. The fiber then passes through the hot aqueous liquid medium 62 contained in the stretch trough 64, and thence over the godet 66 and the auxiliary roller 68, about each of which the fiber is wrapped one or more (e. g., 2 or 3) times. If desired, the peripheral speed of the godet 60 may be slightly greater than that of the converging rolls 42.

The godet 66 is caused to revolve at a peripheral speed greater than that of the godet 60; in other words, the surface speed of godet 66 is such that the ratio of speeds of godets 66 and 60 is proportional to the desired stretch which is to be applied to the fiber as it passes through the hot aqueous liquid medium 62. After leaving the godet 66 the stretched or oriented gelled fiber 70 passes over the guide roll or sheave 72 and then is collected on a take-up spool or bobbin 74 with the aid of the traverse guide 76. A small amount of water or other liquid medium adapted to maintain the stretched fiber in a gel state may be applied by any suitable means to the fiber as it is being collected on the bobbin 74. For instance, the revolving bobbin may be continuously sprayed with water as the fiber is being collected thereon. Instead of being wound upon a spool or bobbin the stretched fiber may be collected, for example, in a centrifugal pot whereby twist is advantageously applied to the wet fiber.

The amount of stretch that is applied to the water-swollen or gelled fiber may be varied widely, but in all cases should be sufficient to cause at least appreciable orientation of the molecules and an improvement in the properties of the fiber undergoing treatment. The amount of tension to which the fiber is subjected obviously should not be so great as to cause the fiber to break. Depending, for example, upon the type of material being stretched or elongated and the particular properties desired in the finished product, the amount of stretch may vary, for instance, from 100%, preferably from 200 or 300%, up to 2000% or more of the original length of the fiber.

The stretch trough 64 illustrates one suitable form of apparatus which may be used in the stretching operation. A transverse sectional view taken along the line 2—2 of the trough shown in Fig. 1 is shown in Fig. 2. A perspective view and another sectional view of this trough are shown in Figs. 5 and 7, respectively, of the drawing accompanying my applications Serial Nos. 68,370, now abandoned and 146,880.

The trough 64 is positioned between the godets 60 and 66 so that the fiber, which is tangent to the tops of the godets, is slightly above (e. g., about ⅛ inch above) the bottom of the V-shaped trough portion 78 as it passes through the hot aqueous liquid medium contained in the trough 64. The fiber 58 enters the stretch trough 64 slightly above the bottom portion of the U of a U-shaped slot in the end wall 79 of the trough. The hot aqueous liquid medium in which the fiber is stretched is preferably circulated through the trough 64, entering the trough through the conduit 80 and leaving through the conduits 82 and 84.

As shown in Fig. 2, the V-shaped trough portion 78 is provided with a series of openings 86 in the bottom of the trough and in each of the sides forming the V. The hot aqueous liquid medium 62 enters the stretch trough 64 through the conduit 80, is forced through the openings 86, thereby mildly agitating the hot aqueous liquid in the trough. The liquid medium 62 flows along the V-shaped trough portion 78 into the collecting reservoirs 88 and 90 located at each end of the stretch trough 64, from which reservoirs it then passes through the conduits 82 and 84 to a supply reservoir (not shown).

The hot aqueous liquid medium 62 which is circulated through the trough 64 may be heated by any suitable means (not shown) to the desired temperature. For example, the water or other aqueous liquid medium employed may be heated electrically, or by gas, steam or other means, in a suitable heating unit having a supply reservoir and connecting conduits to and from the stretch trough 64 for circulation of the hot aqueous liquid medium between the supply reservoir and the stretch trough. To conserve heat and in order better to maintain the temperature of the aqueous liquid in the stretch trough, it is usually desirable to insulate the trough with suitable heat-insulation, e. g., glass fibers, asbestos, cork, etc., in board, sheet, tape or other form in which these materials are available for use as heat insulation. A suitable cover (not shown) which may be hinged or which merely may fit loosely over the top of the trough and is removable therefrom, also advantageously may be provided in order to reduce heat losses and to provide a better control of the temperature of the hot aqueous liquid in the stretch trough. Such a cover likewise is preferably insulated with a suitable insulating material such as one or another of those mentioned above by way of illustration. The cover is raised or removed (if detachable from the trough) when "threading-up" the apparatus, and is closed or put back into place after the thread has been positioned in the stretch trough.

Some of the advantages of using a stretch trough of the kind described above have been mentioned hereinbefore. Another advantage accrues by reason of the slight lift imparted to the thread by the multitude of small jets of water under the thread, thereby preventing any possible sag and contact of the thread with the bottom of the trough.

The stretched, gelled fiber 70 on the bobbin 74 subsequently may be dried or otherwise treated as desired or as conditions may require. For example, the gelled fiber may be dried merely by allowing the bobbin containing the same to stand at room temperature, or it may be heated at a temperature within the range of, say, 40° C. to 120° C. for a period sufficient to dry the wet gel to an irreversible state. Or, a pre-dyed thread may be produced by circulating a suitable dye, e. g., an acetate dye, through the thread package, followed by a water wash and finally, if desired, it may be immersed in a bath of a suitable anti-static and lubricating composition. The thread is then dried and, in the case of bobbin-spun thread or yarn, thereafter may be twisted and wound into packages. Pot-spun yarn may be wound directly. In the case of thread or yarn which is to be dyed later in cloth form, a treating bath containing an aqueous solution of a humectant may be applied to the thread as described and broadly claimed in my copending application Serial No. 772,202, filed September 4, 1947, now abandoned in favor of my copending application Serial No. 182,296, filed August 30, 1950, and wherein further information with regard to dyeing a gelled fiber with various dyes is given. The twisted thread is then dried at a temperature for a time insufficient to convert the gel to an irreversible state, after which it may be twisted and packaged as described above.

Alternatively, the stretched, gelled fiber 70 on the bobbin 74 may be treated with a liquid composition, more particularly an aqueous dispersion, containing an anti-static agent by placing the bobbin supported on a trunnion in a vessel containing the anti-static treating or finishing composition as is shown in Fig. 2 of the drawing accompanying my aforementioned copending application Serial No. 68,370, now abandoned. As there shown, the helices of gelled fiber on the bobbin are treated throughout their length with the liquid anti-static composition as the bobbin rotates while withdrawing the gelled fiber from the bobbin. Any suitable anti-static agent may be employed. Examples of anti-static agents which may be used are the guanylurea and guanidine salts of mono-aliphatic hydrocarbon esters of sulfuric acid, more particularly such salts wherein the aliphatic hydrocarbon grouping contains from 12 to 18 carbon atoms, inclusive, e. g., guanylurea octadecyl hydrogen sulfate, guanidine octadecyl hydrogen sulfate, guanidine oleyl hydrogen sulfate, etc. Other examples of such guanylurea and guanidine salts which may be used as anti-static agents in practicing the present invention are given in my copending applications Serial No. 68,371 and Serial No. 68,372, both of which applications were filed December 30, 1948. Still other examples of anti-static agents which may be used are $\beta$-alkoxypropionitriles, e. g., octadecoxypropionitrile; reaction products of ethylene oxide and a long-chain alkyl guanamine, e. g., octadecyl guanamine; and reaction products of ethylene oxide and a long-chain alkyl guanidine, e. g., octadecyl guanidine.

In a manner similar to that described above pot-spun yarn also may be continuously dried.

It is not essential that the liquid treating composition, e. g., an aqueous dispersion, which is applied to the stretched, gelled fiber 70 contains only an anti-static agent as the sole effect agent which is present in the composition. In some cases, however, it may be desirable or advantageous to use an anti-static agent alone as the sole effect agent, more particularly such agents which are inherently capable of functioning both as a lubricating agent and as an anti-static agent. In other cases it may be desirable to use the anti-static agent in conjunction with other conditioning or effect agents which are commonly employed in treating synthetic fibers, more particularly fibers produced from acrylonitrile polymerization products. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in conjunction with the aforementioned guanylurea salt or guanidine salt or other anti-static agent are wetting and dispersing agents and textile lubricants of various kinds, for instance N-octadecyl disodium sulfosuccinamate, dioctyl sodium sulfosuccinate, lecithin, esters of long-chain fatty acids, e. g., alkyl stearates, palmitates and oleates, more particularly the ethyl, propyl, butyl and amyl stearates, palmitates and oleates.

After being treated with the liquid finishing composition containing the anti-static agent, the treated, stretched fiber in gel state is led continuously over drying rolls, such as those described more fully hereafter and, also, in my aforementioned copending applications Serial Nos. 68,370, now abandoned and 146,880, thence to a pigtail thread guide, and finally to a suitable twister bobbin such, for example, as a ring twister whereby the dry, twisted fiber or thread is collected on a bobbin. Instead of a ring twister, any other suitable type of twister, e. g., a cap twister, or other fiber take-up device adapted to cause the fiber to move continuously over suitable drying rolls and to be collected on a fiber or thread-storage device may be employed.

If desired, the spinning, stretching and drying operations may be, and preferably are, carried out continuously, for instance as shown by way of illustration in Fig. 3. The various parts of the apparatus there shown are essentially the same up to and including the stretching operation as those shown in Fig. 1, and corresponding parts, therefore, have been numbered the same in both figures. In Fig. 3 the supply line 26 is shown as entering the side of the vessel 22 whereas in Fig. 1 the same line is shown as entering at the bottom of the vessel; also, in Fig. 3 the spinneret coupling or heading 16 is shown as being positioned at an angle of less than 90° to the surface of the aqueous bath 20.

With further reference to Fig. 3 the drying unit there shown by way of illustration comprises two positively driven, converging, drying drums or rolls 92, suitably spaced from each other, suspended in the same vertical plane, and rotating at the same peripheral speed. These rolls are slightly inclined (i. e., converge) toward each other at the delivery or take-off end thereby to advance the thread over the rolls in the same manner as do the rolls 42. The degree of convergency may be varied as desired or as conditions may require in order to advance the thread in a plurality of helices over the rolls. Either one or both of the rolls 92 may converge slightly toward each other at the delivery end, the degree of convergence being shown in an exaggerated manner in Fig. 3. With rolls 4 inches in diameter and 10 inches long, satisfactory results have been obtained by having the lower roll convergent to the upper roll, at the delivery end, by an angle of about 0.6°. If desired, both of the rolls 92 may be tilted at a suitable angle to the horizontal, e. g., at an angle of from about 2° to about 10°, more particularly about 5°, to the horizontal.

Either or both of the rolls 92 may be heated by any suitable means. For instance, the rolls may be heated and the advancing thread dried by blowing a blast of hot air or other hot gas over the surfaces of either or both rolls. Preferably, however, either or both rolls are hollow and are internally heated so as to provide a surface temperature within the range of about 40° C. to about 200° C., more particularly within the range of about 50° or 60° C. to about 100° or 120° C. Thus the hollow rolls or drums 92 may be internally heated electrically, or by steam, hot air or other gas, hot water or by any other suitable means. A simple method of internally heating either or both rolls is by radiation from electrical strip heaters positioned within the rolls, which heaters are mounted by clamping onto a support bar.

In operation, the stretched or oriented, gelled fiber 70 is dried continuously as it advances in a helical path over the drying rolls 92 from the feed-on end to the delivery end. At the feed-on end of either or both rolls, a finishing composition containing an anti-static agent is applied, as by means of a suitable jet, to the first few helices of fiber advancing along the rolls. In Fig. 3 the anti-static finish is shown by way of illustration as being applied by means of jet 94 upon the upper of the two drying rolls. The jet is preferably so positioned that the anti-static composition is applied directly to the first few helices of the fiber or thread advancing along the rolls. Since the rolls are tilted at an angle to the horizontal, the anti-static finish flows along the upper roll countercurrent to the advancing thread, thereby providing effective contact between the finish and the thread. After contacting the advancing fiber, the liquid anti-static composition drips or flows into collector tray or basin 96 provided with a suitable conduit or drain for withdrawing the excess finishing composition.

From the foregoing description it will be seen that the advancing helices of the treated gelled fiber are dried continuously, and that a portion of each helix is in contact with a heated surface, advantageously a smooth, heated surface so that the possibility of damage to the fiber as it advances over the rolls will be minimized. The temperature of this surface, the portion of each helix which is in contact therewith, the duration of said contact and the number of helices in contact with the heated surface are such that the helices of gelled fiber are dried. Because of the application of the anti-static agent to the gelled fiber prior to its passage over the heated rolls, there is no accumulation of an electrostatic charge on the fibers during their passage over the rolls and, therefore, no difficulty in the continuous drying of these particular fibers of an acrylonitrile polymerization product by the particular method herein described. In the absence of such a pretreatment of the wet, gelled fiber with a composition comprising an anti-static agent, it is extremely difficult, if not impossible, to successfully dry advancing helices of a wet fiber of an acrylonitrile polymerization product due to the charge of static electricity which the fiber accumulates (apparently mainly as a result of friction as the fiber passes over the surface of the roll), thereby causing spreading of the filaments in each helix so that successive helices may overlap and cause damage to the filaments. Furthermore, when the dry thread is delivered from the drying rolls to a twisting bobbin or other collecting device, the "ballooning" of the filaments caused by the accumulated static charge may cause mechanical damage to the thread when contacting friction points such as the pigtail guide 98 to which the dried fiber 100 is led from the delivery end of the drying rolls 92 and thence to a suitable twister bobbin such, for example, as the ring twister 102 whereby the dry, twisted fiber or thread is collected on the bobbin 104.

The rolls 42 and 92 may be made of any suitable material such, for example, as Monel metal, stainless steel, aluminum, anodized aluminum, chromium-plated copper, chromium-plated steel, dense graphite, fused quartz, glass, resin-impregnated glass-fiber laminate, etc. The rolls are preferably made of a material which is a good thermal conductor, that is, a material which will permit the rapid transfer of cold from the interior surfaces to the external surfaces of the cold treating rolls 42 and of heat from the interior surfaces to the external surfaces of the hot drying rolls 92. The rolls may be made of one base material, which then may be plated or otherwise covered with a smooth layer of another material, e. g., a chrome plating. The rolls 42 are preferably made of, or surfaced with, a corrosion-resistant material.

Instead of applying the anti-static finish as described above, this finish may be applied to the wet, gelled fiber in the manner described in my aforementioned copending applications Serial Nos. 68,370, now abandoned and 146,880 with particular reference to Figs. 3 and 4 of the drawings accompanying those applications and in the manner there illustrated. Thus, the spun and stretched fiber may be treated with a treating composition comprising an anti-static agent by continuously passing it through a trough through which is circulated an anti-static treating composition, which may be of the kind mentioned hereinbefore. This trough may be of the kind shown in Figs. 1, 2 and 3, but it will be understood, of course, that any suitable vessel or container, which will hold or through which can be circulated the anti-static treating composition and through which the fiber can be continuously passed as hereinbefore described in contact with the said composition, may be employed. The anti-static treating composition which is circulated through such a trough may be at any suitable temperature, e. g., within the range of about 40° C. to about 70° C. Circulation of the anti-static composition through the trough is effected in the same manner as has previously been described with reference to the circulation of water through the stretch bath or trough 64. After being treated with the liquid finishing composition containing the anti-static agent, the treated, stretched fiber in gel state is then continuously dried, for example by passing the fiber over drying rolls such as the rolls 92.

Alternatively, instead of using separate baths for stretching the fiber and for treating it with a composition comprising an anti-static agent, both operations may be effected by continuously passing the gelled fiber 58 through a combination stretch and anti-static treating bath. During its passage through this bath the gelled fiber is stretched between godets while the fiber is in contact with a liquid medium comprising water and, also, is simultaneously treated with an anti-static agent (numerous examples of which have been given hereinbefore), since such an agent likewise is a component of the liquid medium. The temperature of the liquid medium constituting the combined stretch and anti-static treating bath may be considerably varied, but is usually within the range of about 70° C. to about 100° C. The stretched gel, which has been treated with an anti-static agent conjointly with stretching to orient its molecules along the fiber axis, is then continuously dried, for instance by causing advancing helices of the gelled fiber to pass over drying rolls such as the rolls 92. Such a method of operation is illustrated in Fig. 4 of the drawing accompanying my copending applications Serial Nos. 68,370, now abandoned and 146,880 and also is readable upon Fig. 3 of the drawing of the present application when the aqueous medium 62 in the stretch trough 64 is a liquid medium comprising water and, also, an anti-static agent. When such a procedure is followed, it is not necessary to apply an anti-static finish through the jet 94 to the gelled fiber advancing in a helical path along the drying rolls 92.

Figures 4, 6:
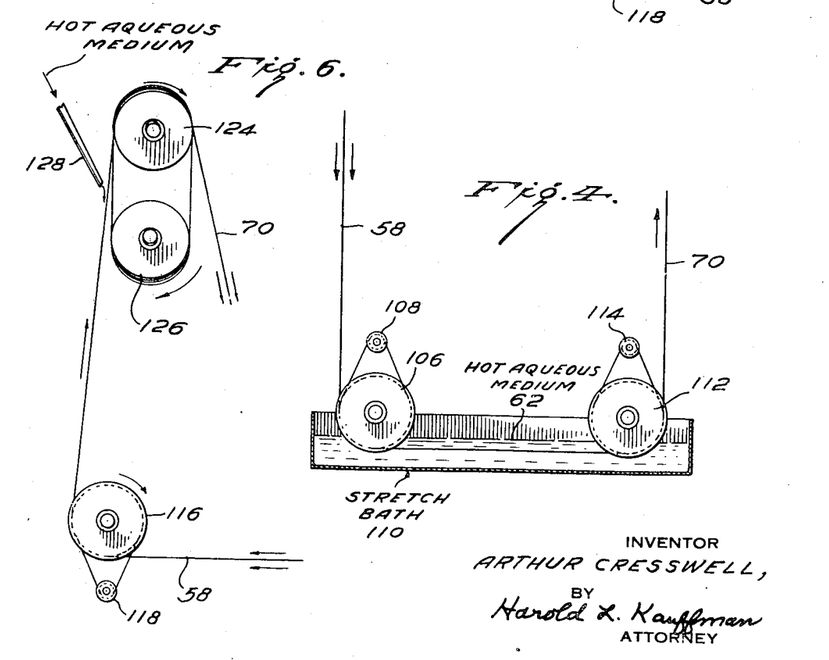
Figs. 4, 5 and 6 show somewhat schematically other forms of apparatus that may be used in stretching the gelled fiber while it is in a line which is tangent to two rotating circular surfaces and between which there is no other point of solid, frictional contact.
Figure 5:
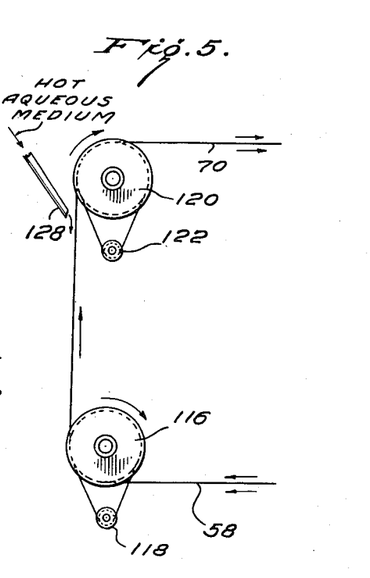

Figs. 4, 5 and 6 illustrate other means by which the gelled fiber 58 may be stretched in the presence of moisture or water, at a temperature within the range of about 70° C. to about 100° C. and while it is in a line which is tangent to two rotating circular surfaces and between which there is no other point of solid frictional contact, the peripheral speed of one of the said rotating surfaces being greater than that of the other thereby to maintain the gelled fiber under tension.

In the embodiment of the invention illustrated in Fig. 4 the two rotating circular surfaces are each in contact with the hot aqueous medium constituting the stretch bath or combination stretch and anti-static treating bath. As there shown, the gelled fiber 58 passes over the revolving wheel or godet 106 and the auxiliary roller 108, being wrapped one or more (e. g., two or three) times about each, into the hot aqueous liquid medium 62, e. g., hot water, contained in the stretch vessel or bath 110, and thence over the godet 112 and the auxiliary roller 114, about each of which the fiber also is wrapped one or more (e. g., two or three) times. The godet 112 is caused to revolve at a peripheral speed greater than that of the godet 106 so as to impart the desired stretch or elongation to the fiber as has been described hereinbefore. The stretched or oriented fiber 70 may be collected on a bobbin 74 (Fig. 1) or in a pot, or it may be dried on continuous drying rolls as has been described hereinbefore with reference to Fig. 3. The temperature of the hot aqueous medium 62 and its composition, which may include an anti-static agent, are the same as previously have been described. Of course it will be understood that the bath 110 may be provided with suitable inlet and outlet conduits (not shown) for the circulation of the hot aqueous medium through the bath; or steam coils or any other suitable means may be provided in the bath for heating the liquid medium in the event that provision is not made for recirculation. In the embodiments of the invention shown in Figs. 5 and 6 the gelled fiber 58 passes over the godet 116 and the auxiliary roller 118, being wrapped one or more (e. g., two or three) times about each, and thence either over the godet 120 and the auxiliary roller 122 (Fig. 5), about each of which the fiber also is wrapped one or more times, or over the pair of converging rolls 124 and 126 (Fig. 6) in a plurality of wraps or helices. The latter are designed and positioned so that the fiber advances in a helical path over the rolls as has been described above with reference to rolls 42 and 92. Either or both of these converging rolls may be heated in the same manner as previously has been described with reference to rolls 92. The converging rolls 124 and 126 revolve at the same peripheral speed, and both of these rolls and the godet 120 revolve at a speed greater than that of the godet 116 so as to keep the fiber 58 under tension and to apply the desired stretch to it. As the fiber 58 is led upwardly over the godet 120 or over the converging rolls 124 and 126, a small amount of a hot aqueous liquid medium, such as that which has been described hereinbefore with reference to the stretch baths 64 and 110, is applied to, as for instance by means of the jet 128, and allowed to trickle downwardly over the upwardly rising fiber 58. A similar stream of hot aqueous medium may be applied to the stretched, gelled fiber as it is led over the godet 120 or as it advances in a helical path over the converging rolls 124 and 126. The stretched, gelled fiber 70 subsequently may be handled as has been described above with reference to Fig. 4.

It will be understood, of course, by those skilled in the art that, in practicing the present invention, the solution of the polymeric or copolymeric acrylonitrile in the chosen solvent should be of such a concentration that a composition having a workable viscosity is obtained. The concentration of the polymerization product will depend, for example, upon the particular solvent and extrusion apparatus employed, the diameter of the fiber to be spun and the molecular weight of the polymerization product, which usually is within the range of 15,000 to 300,000, as calculated from viscosity measurements using the Staudinger equation, and advantageously is of the order of 35,000 or 40,000 to 140,000 or 150,000. The concentration of polymer or copolymer may range, for example, from 7 or 8% up to 18 or 20% by weight of the solution. The viscosity of the solution, as determined by measuring the time in seconds for a Monel metal ball $\frac{1}{8}$ inch in diameter to fall through 20 cm. of the solution at 61° C., may be, for instance, from 10 to 500 seconds. It has been found that the best spinning solutions from the standpoint of coagulation and optimum properties of the precipitated gel are those which contain the highest concentration of polymer and the lowest concentration of zinc chloride, sodium or calcium thiocyanate, guanidine thiocyanate or other salt of the kind aforementioned, which concentrations are consistent with solubility and viscosity limitations. A concentration of 15% polymeric or copolymeric acrylonitrile in 50–60% sodium or calcium thiocyanate solution has been found to give very satisfactory results. The viscosity of the solution should not be so high that it is difficult to filter or to stir and de-aerate prior to use.

As has been pointed out hereinbefore and in my aforementioned copending applications Serial Nos. 772,200 and 68,370 which latter application has now been abandoned, the temperature of the aqueous coagulating bath is critical in the formation of a useful, workable, polymeric or copolymeric acrylonitrile fiber. When the polymerization product is coagulated in water at a temperature substantially above +10° C., e. g., at 20° or 25° C. or higher, an opaque, weak, non-ductile structure results. This structure becomes increasingly weak and less transparent the higher the temperature of coagulation above about +10° C. However, by coagulating in a liquid coagulant comprising water at or below +10° C. e. g., in water at +1 to +5° C., or in an alcohol-water mixture at lower temperatures, e. g., at 0° to −10° C., the coagulated product is clear or substantially clear, cohesive, tough, ductile and capable of being oriented in its water-swollen or gel state. Generally speaking, the clearer the gelled or coagulated material, the greater its ductility.

I am unable to state with certainty the reasons why the use of a cold aqueous coagulating bath as described herein and in my copending applications Serial Nos. 772,200 and 68,370, which latter application has now been abandoned, causes such a surprising change in the properties of the coagulated polymeric or copolymeric acrylonitrile. One logical explanation is that the low-temperature coagulation or precipitation of the extruded polymerization product results in the formation of a highly hydrated structure, possibly with water molecules held by secondary forces to the nitrile groups. Once this structure has been formed at low (sub-normal) temperatures of the order of −15° C. to +10° C. it is quite stable when preserved under water at temperatures as high as 50° C., although coagulation or precipitation at temperatures materially above +10° C. results in a non-transparent, weak gel having little or no ductility.

In order that those skilled in the art better may understand how the present invention can be carried into effect the following examples are given by way of illustration and not by way of limitation. All parts and percentages are by weight.

Example 1

One hundred parts of water-free acrylonitrile was mixed with 1470 parts of water in a jacketed container provided with a stirrer. The mixture was heated to 40° C., and 0.75 part of ammonium persulfate, 0.75 part of sodium metabisulfite and 1.87 parts of sodium sulfate were added thereto in the order just given. The polymerization reaction was allowed to proceed for two hours with the jacket temperature so adjusted as to keep the temperature of the reaction mass at 40° C. The resulting slurry was filtered, and the cake was washed by re-slurrying in water and re-filtering until a negative test for sulfate ion was obtained. The washed, crumbly mass of polyacrylonitrile was spread on stainless steel trays and dried for about 16 hours at 65° C. in a circulating air oven. The dry "crumb" was then ball-milled to a fine powder. A solution of 1 gram of the powdered polyacrylonitrile in 100 ml. of 60% sodium thiocyanate had a viscosity of 41.5 centipoises as determined at 40° C. using an Ostwald-Cannon-Fenske viscosimeter.

Ninety-three parts of a 53% aqueous solution of calcium thiocyanate was adjusted to a pH of 7.0 with dilute hydrochloric acid. This solution was cooled to —10° C. in a "Dry Ice" (solid carbon dioxide)-acetone bath. Seven parts of polyacrylonitrile, produced as above described, was mixed into the cooled aqueous solution of calcium thiocyanate with rapid stirring.

The resulting slurry was transferred to a mixing unit comprising a jacketed stainless steel tank provided with a cover and a stirrer, and was stirred therein for 48 hours at 45° C. under an atmosphere of carbon dioxide in order to effect complete solution of the polyacrylonitrile in the aqueous calcium thiocyanate. The resulting solution was filtered by forcing it through a sand filter under 40 pounds carbon dioxide pressure. The filtered solution was held under vacuum for several days at 25° C. until all of the gas bubbles had been removed. The resulting gas-free solution was then held under vacuum for an additional 18 hours prior to use as a spinning solution. The polymer content of the solution, as determined by casting, drying and weighing a film of the cast solution, was 7%. The viscosity of the solution, as determined by measuring the time for a Monel ball, ⅛ inch in diameter and weighing 0.142 gram, to fall through 20 centimeters of the solution maintained at 61° C., was 208 seconds.

The above solution was spun into fibers by extruding it through a 40-hole spinneret with holes of 110 microns diameter into a coagulating bath consisting of water cooled to 1–2° C. The solution was heated inside the spinneret prior to extrusion by means of a steam-heated "finger." The coagulated fiber was carried back and forth through the bath by means of a power-driven, submerged godet positioned at one end of the bath and a set of free-running rollers at the other end. The total bath travel of the gelled fiber was about 144 inches.

The spun fiber was led out of the coagulating bath over several guide rollers and a driven godet A through a 12-inch trough containing water heated to 98°–99° C. The fiber was stretched in this bath about 600% by leading it over a second driven godet B, the peripheral speed of which was greater than that of the godet A, and thence over a roller onto a take-up bobbin. The stretch trough was designed as has been described hereinbefore with reference to Figs. 1, 2 and 3. The fiber was stretched in this trough in a line which was tangent to two rotating circular surfaces, more particular godets A and B, and between which there was no other point of solid, frictional contact. The take-up bobbin was provided with a traverse motion and was continuously sprayed with water to retain the fiber in the gel state. When sufficient thread had been spun the bobbin was removed and submerged in water to remove any residual calcium thiocyanate that may have been present in the gelled thread.

The bobbin of wet gelled yarn was then suspended in a trough containing an aqueous dispersion of 1% of an anti-static agent, specifically guanidine octadecyl hydrogen sulfate, and 0.5% of a textile lubricant, more particularly butyl stearate. The dispersion was maintained at 40°–50° C.

Yarn from the immersed bobbin and which had been treated with a dispersion containing an anti-static agent was continuously led over a drying unit consisting of two, positively driven, stainless steel rolls, each of which was 4 inches in diameter and 10 inches long, and which were suspended in the same vertical plane 8 inches apart and were slightly inclined toward each other at the delivery ends thereby to advance the thread over the roll. Each roll was electrically heated internally so as to provide an external surface temperature of about 65–70° C., and was rotated at a peripheral speed of about 33.8 meters per minute. The wet gelled yarn was helically wound around both rolls to form 42 loops or helices, each having an average circumference of about 0.724 meter. The dried yarn was then led directly from the delivery end to a ring twister for an insertion of 2.8 turns per inch S twist. The yarn dried satisfactorily without accumulation of an electrostatic charge, and no damage to the dried fibers or any operating difficulties during drying.

The finished yarn had a denier of 115, contained 0.92% by weight of the dried untreated yarn of "finish," had a dry tensile strength of 4.5 grams per denier, a wet tensile strength of 3.6 grams per denier, and dry and wet elongations of 14%.

Example 2

One part of methyl acrylate and 19 parts of water-free acrylonitrile were mixed with 329 parts of water in a jacketed container provided with a stirrer. The mixture was heated with stirring to 40° C., after which 0.3 part of ammonium persulfate, 0.3 part of sodium metabisulfite and 0.33 part of sodium sulfate were added thereto in this order. The reaction was allowed to proceed for 4 hours with the jacket temperature so adjusted as to keep the reaction mass at 40° C. The resulting slurry was filtered, washed, dried and ball-milled in the same manner as described under Example 1 with the exception that the washed "crumb" was dried for about 16 hours at 60° C.

A solution of 1 gram of the methyl acrylate-acrylonitrile copolymer in 100 ml. of 60% sodium thiocyanate had a viscosity of 23.7 centipoises at 40° C. using an Ostwald-Cannon-Fenske viscosimeter.

Ninety-three parts of a 53% aqueous solution of calcium thiocyanate was adjusted to a pH of 6.8 with dilute hydrochloric acid. This solution was cooled to −10° C. as described under Example 1, after which 7 parts of the above-described copolymer of acrylonitrile and methyl acrylate was mixed therein with rapid stirring. The resulting slurry was treated as described under Example 1 in order to dissolve the copolymer in the aqueous calcium thiocyanate solution and to obtain a de-aerated solution of copolymer which would be suitable for spinning.

The amount of copolymer in the above-described spinning solution was 7%, as determined by casting, drying and weighing a film of the cast solution. The falling ball viscosity of this copolymer solution at 61° C., as determined by the method described under Example 1, was 33.6 seconds.

This solution was spun and stretched to obtain an oriented fiber formed of a copolymer of acrylonitrile and methyl acrylate in exactly the same manner set forth under Example 1 with the exception that the fiber was stretched 900% in the stretch bath.

The bobbin containing the collected, wet, gelled copolymer yarn or fiber was suspended in a trough containing an aqueous dispersion of 2% guanylurea octadecyl hydrogen sulfate (anti-static agent) and 1% of N-octadecyl disodium sulfosuccinamate (dispersing agent). This dispersion was maintained at a temperature of 40°–50° C.

The treated yarn was continuously dried, with no accumulation of an electrostatic charge during drying, in exactly the same manner described under Example 1 with the exception that the external surface temperature of the electrically heated rolls was about 70°–75° C. The dried yarn had a denier of 85, a "finish" content of 2.2% based on the weight of the dry, untreated yarn, a dry tensile strength of 4.6 grams per denier, a wet tensile strength of 4.5 grams per denier, and dry and wet elongations of 12%.

Example 3

A copolymer of acrylonitrile and acrylamide was prepared by first dissolving 198 parts of acrylonitrile in 2197 parts of water, to which was added 224.4 parts of a 9.8% aqueous acrylamide solution. The temperature of the solution was brought to 38° C. and then 3.5 parts of sodium metabisulfite was added, followed by 3.5 parts of ammonium persulfate. When surrounded by a water bath at 40° C., the temperature of the reaction mixture increased during the first 20 minutes to 44° C. and then gradually decreased until it was 40° C. at the end of 60 minutes. After continuing the reaction for another 60 minutes at 40° C. the copolymer of 90% acrylonitrile and 10% acrylamide was filtered off, washed and dried. One gram of this copolymer, dissolved in 60% sodium thiocyanate solution to make 100 ml. at 20° C., gave a solution having a viscosity of 19.2 centipoises at 40° C.

Fifteen parts of the copolymer prepared as described above was dissolved at 45° C. in 85 parts of 55% aqueous sodium thiocyanate to yield a solution having a ball-fall viscosity (as previously described) of 407 seconds at 61° C. After filtering and de-aerating, the solution containing 15% copolymer was extruded through a metal spinneret having 100 holes, the diameter of the holes being 55 microns. The solution was heated to reduce the viscosity before extrusion by using a steam-heated "finger" inside the spinneret. Extruding at the rate of 1.53 grams of solution per minute, the fiber was coagulated in water at 5° C. The extruded fiber formed a multifilament thread with complete separation of all of the filaments. The fiber was drawn from the spinneret with 9.5 inches of bath travel to a roller and thence vertically to a godet with a peripheral speed of 1.39 meters per minute. The highly hydrated fiber was clear, tough and ductile. After wrapping the fiber 2½ times around the aforementioned godet, the fiber was carried through 24 inches of bath travel in water at 98° C. and thence to a second godet with a peripheral speed of 18.5 meters per minute around which the fiber was wrapped 2½ times. The peripheral speed of the second godet was 13.3 times that of the first godet, and stretching of the fiber between the godets took place as described under Example 1. The stretched fiber was wound on a bobbin while still wet, a spray of water being maintained on the bobbin to prevent any drying out of the fiber.

The bobbin of wet, gelled yarn was then suspended in a trough containing an aqueous dispersion of 1% of guanidine octadecyl hydrogen sulfate (anti-static agent) and 0.5% of butyl stearate (textile lubricant). The dispersion was maintained at 40°–50° C.

The treated yarn was continuously dried, with no accumulation of static electricity during drying, in exactly the same manner described under Example 1 with the exception that the external surface temperature of the electrically heated rolls was about 70°–75° C.

Example 4

Same as Example 1 with the exception that the spun fiber was led out of the coagulating bath and thence over a treating unit consisting of two, positively driven, stainless steel rolls, each of which was 4 inches in diameter and 10 inches long, and which were suspended in the same plane 8 inches apart and were slightly inclined toward each other at the delivery ends thereby to advance the thread over the rolls. Each roll was internally cooled by circulating refrigerated brine solution at a temperature of about 0°–1° C. through the rolls and so as to provide an external surface temperature not higher than about +5° C. The wet, gelled yarn was helically wound around both rolls to form a plurality of loops or helices, the total length of the fiber on the rolls being about 18 yards. The rolls were tilted at an angle of about 5° to the horizontal as shown in Figs. 1 and 3. Water at a temperature of about +1° C. was applied to the helices of fiber near the take-off end, and flowed over the rolls countercurrently to the advancing helices thereby thoroughly washing the fiber with cold water. From the delivery or take-off end of the converging rolls, the fibers were led to a godet and thence to a stretch trough wherein the fiber was stretched to impart orientation thereto as described under Example 1. The stretched, gelled fiber was collected on a bobbin and was then dried by allowing it to stand at room temperature. If desired, it may be continuously dried, for example by drying advancing helices of the wet fiber (previously treated with an anti-static finish) on heated, converging rolls as described under Example 1.

Example 5

A spinning solution was prepared from a copolymer of acrylonitrile and methyl acrylate as described under Example 2. The same procedure was followed in producing a synthetic fiber from this solution as described under Example 4 with the exception that instead of collecting the stretched, gelled fiber on a bobbin, the fiber was led directly from the stretch bath over heated drying rolls as described under Example 1. In other words, the entire process was a continuous one as shown by way of illustration in Fig. 3 of the drawing accompanying the present application.

It will be understood, of course, by those skilled in the art that my invention is not limited to the specific polymerization products and solutions thereof, the specific conditions of spinning, the specific method of treating or washing advancing helices of the gelled fiber, the specific method of stretching the fiber while it is in a line which is tangent to two rotating circular surfaces and between which there is no other point of solid frictional contact, the specific anti-static agents nor to the specific conditions of anti-static treatment and drying given by way of illustration in the above examples and shown by way of example in the accompanying drawings. Thus, instead of the particular copolymers employed in Examples 2, 3 and 5 I may use any other thermoplastic copolymers of a major proportion of acrylonitrile and a minor proportion of another monomer or monomers copolymerizable therewith, numerous examples of which latter have been given hereinbefore and in my aforementioned copending application Serial No. 772,200. Likewise, I am not limited to the particular proportions of copolymerizable monomers as set forth in Examples 2 and 3. Thus, I may use methyl acrylate or acrylamide as comonomers with acrylonitrile in various other proportions within the range of, by weight, from about 85% to about 97% of acrylonitrile to from about 15% to about 3% of methyl acrylate or acrylamide, more particularly within the range of, by weight, from about 90% to about 95% of acrylonitrile to from about 10% to about 5% of methyl acrylate or acrylamide. Similar ranges of proportions also may be used advantageously in many cases with other comonomers, for example such comonomers as those mentioned previously herein by way of illustration.

Of the copolymeric acrylonitriles used in practicing the present invention, I prefer to employ an acrylonitrile copolymer containing in the copolymer molecules an average of at least about 85% by weight of combined acrylonitrile. In such copolymeric products, the proportions of monomers in the polymerizable mixture from which the copolymers are made preferably are adjusted so that the final copolymer contains in the molecules thereof an average of at least about 85% by weight of acrylonitrile (combined acrylonitrile). The expression "acrylonitrile polymerization product containing in the molecules thereof an average of at least about 85% by weight of combined acrylonitrile," as used herein and in certain of the appended claims, means a polymerization product (polymer, copolymer or interpolymer or mixture thereof) containing in its molecules an average of at least about 85% by weight of the acrylonitrile unit, which is considered to be present in the individual polymer molecule as the group or, otherwise stated, at least about 85% by weight of the reactant substance converted into and forming the polymerization product is acrylonitrile (combined acrylonitrile).

Likewise, it will be understood by those skilled in the art that the present invention is not limited to the specific anti-static agents nor to the specific finishing compositions containing such an agent that are given in the above illustrative examples, since any other anti-static agent or composition containing the same, numerous examples of which have been given hereinbefore, and which is adapted to obviate or retard materially the accumulation of static electricity during the continuous drying of the helices of the wet, gelled fiber as hereinbefore described, may be employed.

The anti-static agent may be applied to the gelled fiber prior to drying by any suitable means, but preferably it is applied in the form of a liquid dispersion, more particularly an aqueous dispersion. This dispersion may contain any suitable amount of anti-static agent, but ordinarily such an agent is present in the dispersion in an amount corresponding to from about 0.5% to about 5% by weight thereof. The dispersion may be applied, for example, by immersing the fiber in the dispersion, or by spraying or otherwise contacting the fiber with the dispersion. In applying the dispersion, it is preferably heated to an elevated temperature, e. g., from about 45° or 50° C. to about 95° C., or in some other cases even as high as 100° C. With some anti-static agents the dispersion containing the same may be applied at room temperature (20°–30° C.) or at temperatures up to 45° C., but such temperatures may be less desirable with other anti-static agents because of the greater difficulty in maintaining the anti-static agent homogeneously dispersed in water or other volatile liquid dispersion medium at the lower temperatures. Upon continuously drying the treated, gelled fiber as hereinbefore described, the dried fiber has the anti-static agent deposited at least on the outer surfaces thereof. The amount of anti-static agent which is present in or on the dried, treated fiber may vary considerably, but ordinarily it is present therein or thereon in an amount, by weight, corresponding to from about 0.2% to about 4% of the dried, untreated fiber.

The liquid composition containing the anti-static agent may be applied to the wet, gelled fiber at any suitable stage during its production and prior to continuous drying of the same as hereinbefore described. As previously has been mentioned, it may be applied during the stretching of the wet spun fiber to orient the molecules thereof; or it may be applied between any of the guides or godets or other rolls employed in the spinning process and which precede the continuous drying of the wet fiber. In some cases the gelled fiber may be dyed, treated with an anti-static agent, and the wet, dyed fiber in gel state then may be continuously dried as previously has been described with particular reference to an undyed, gelled fiber.

If desired, the finishing composition containing the anti-static agent which is deposited in or on the treated, dried fiber may be allowed to remain in place during and after the production of the article in its ultimate form, especially in those cases wherein the treated fiber or fabric or other textile or article made from the same is not later to be dyed. If the dried, treated fiber or fabric or other textile or article produced from the fiber is to be dyed, then the finishing composition containing the anti-static agent is usually removed therefrom prior to dyeing, for example by means of the usual aqueous scouring baths.

The present invention provides an effective and economical method of continuously stretching a gelled fiber, as well as a rapid, efficient and economical method of continuously washing a wet spun, unstretched fiber and of continuously drying a stretched, gelled fiber of an acrylonitrile polymerization product. By using the continuous washing and stretching steps in conjunction with a continuous drying step, dried fibers of uniform characteristics are obtained rapidly, at low operating cost due to the continuous drying technique employed and with less thread damage than when a package-spun, e. g., bobbin or cake, wet thread is dried as a package and later unwound for twisting or rewinding.

The term "fiber" as used generically herein and in the appended claims is intended to include within its meaning both monofilaments and multifilaments.

I claim:

1. The method of producing a synthetic fiber from a soluble, thermoplastic product of polymerization of a polymerizable mass comprising mainly acrylonitrile, said method comprising extruding the said product in the form of a fiber from a water-coagulable solution of the said polymerization product dissolved in a concentrated aqueous solution of a water-soluble salt which yields highly hydrated ions in aqueous solution; immediately after extrusion contacting the extruded mass with a liquid coagulant comprising water, said coagulant being at a temperature not exceeding +10° C., thereby to precipitate the said product from the said solution as a stretchable, gelled fiber; continuously stretching the said gelled fiber, while it is in contact only with a fluid medium comprising moisture, at a temperature within the range of about 70° C. to about 100° C.; and continuously drying the stretched fiber.

2. The method of producing a synthetic fiber from a soluble, thermoplastic product of polymerization of a polymerizable mass comprising mainly acrylonitrile, said polymerization product being dissolved in a concentrated aqueous solution of a water-soluble salt which yields highly hydrated ions in aqueous solution and said method comprising continuously extruding the said product in the form of a fiber from a water-coagulable solution thereof; immediately after extrusion contacting the continuously moving, extruded mass with a liquid coagulant comprising mainly water, said coagulant being at a temperature not exceeding +10° C., thereby to precipitate the said product from the said solution as a stretchable, gelled fiber; applying to the said gelled fiber, while it is continuously moving in a helical path, a liquid treating agent comprising water, said treating agent being at a temperature not exceeding +10° C.; continuously stretching the treated gelled fiber, while it is in contact only with a fluid medium comprising water, at a temperature within the range of about 70° C. to about 100° C.; and drying the stretched fiber.

3. The method of producing a synthetic fiber from a water-coagulable solution of a thermoplastic product of polymerization of a polymerizable mass comprising at least about 85% by weight of acrylonitrile, said polymerization product being dissolved in a concentrated aqueous solution of a water-soluble salt which yields highly hydrated ions in aqueous solution and said method comprising continuously extruding the said solution in the form of a fiber; immediately after extrusion immersing the continuously moving, extruded fiber in a liquid coagulant comprising mainly water, said coagulant being at a temperature within the range of —15° C. to +10° C., thereby to obtain a gelled, stretchable fiber; applying to the said gelled fiber, while it is continuously moving in a helical path, a liquid treating agent comprising mainly water, said treating agent being at a temperature of from about 0° C. to not more than +10° C.; continuously stretching the treated gelled fiber at least about 100% while passing through and in contact only with water maintained at a temperature within the range of about 70° C. to about 100° C.; applying a liquid composition containing an anti-static agent to the continuously moving, stretched gel; and continuously drying the resulting gelled fiber while it is moving in a helical path.

4. The method of producing a synthetic fiber from a viscous, water-coagulable solution of a thermoplastic product of polymerization of a polymerizable mass comprising at least about 85% by weight of acrylonitrile, said polymerization product being dissolved in a concentrated aqueous solution of a water-soluble metallic salt which yields highly hydrated ions in aqueous solution, and said method comprising heating the said solution at an elevated temperature sufficiently high to reduce its viscosity; continuously extruding the said solution while thus being heated in the form of a fiber; immediately after extrusion immersing the continuously moving, extruded fiber in a liquid coagulant comprising mainly water, said coagulant being at a temperature not higher than about +5° C., thereby to obtain a gelled stretchable fiber; and continuously stretching the gelled fiber at least about 100% in the presence of and in contact only with water, at a temperature within the range of about 70° C. to about 100° C.; applying an aqueous composition containing an anti-static agent to the stretched fiber in gel state; and continuously drying the resulting gelled fiber by causing it to move in a helical path in contact with a surface at least a portion of which is heated to a temperature sufficiently high to dry the said fiber.

5. The method of producing a synthetic fiber which comprises spinning a water-coagulable solution of an acrylonitrile polymerization product containing in the molecules thereof an average of at least about 85% by weight of combined acrylonitrile, said polymerization product having a molecular weight within the range of about 15,000 to about 300,000 as calculated from viscosity measurements using the Staudinger equation and being dissolved in a concentrated aqueous solution of a water-soluble thiocyanate, and said solution being spun into a spinning bath maintained at a temperature within the range of —15° C. to +10° C. and comprising mainly water, whereby a spun, stretchable fiber in gel state is obtained; applying to the said gelled fiber, while it is continuously moving in a helical path, water at a temperature of from about 0° C. to not higher than +10° C. thereby to remove from the said gelled fiber any of the said thiocyanate which may still be present therein or thereon; continuously stretching the treated gelled fiber while it is in contact only with water maintained at a temperature within the range of about 90° C. to about 100° C.; applying an aqueous dispersion containing an anti-static agent to continuously advancing helices of the stretched, gelled fiber;

and continuously drying advancing helices of the resulting gelled fiber, at least a portion of each helix being in contact with a smooth, rotating, heated surface, the temperature of the said surface, the portion of each helix which is in contact therewith, the duration of said contact and the number of helices in contact with the said heated surface being such that the said helices of gelled fiber are dried.

6. A method as in claim 5 wherein the acrylonitrile polymerization product is dissolved in a concentrated aqueous solution of calcium thiocyanate.

7. A method as in claim 5 wherein the acrylonitrile polymerization product constitutes from about 7% to about 20% by weight of the solution of the water-soluble thiocyanate, the water-coagulable solution of the acrylonitrile polymerization product has a viscosity within the range of from about 10 seconds to about 500 seconds, as determined by measuring the time in seconds for a Monel metal ball having a diameter of ⅛ inch to fall through 20 cm. of the solution at 61° C. and the acrylonitrile polymerization product is dissolved in a concentrated aqueous solution of sodium thiocyanate.

8. The method of producing a synthetic fiber which comprises continuously extruding, so as to form a fiber, a water-coagulable solution of a thermoplastic product of polymerization of a polymerizable mass comprising at least about 85% by weight of acrylonitrile, said polymerization product being dissolved in a concentrated aqueous solution of a water-soluble thiocyanate; immediately after extrusion immersing the continuously moving, extruded mass in a spinning bath comprising mainly water, said bath being maintained at a temperature not higher than about +5° C., thereby to obtain a gelled fiber having considerable elasticity and toughness; applying to continuously advancing helices of the gelled fiber a liquid treating agent comprising mainly water, said treating agent being at a temperature not higher than about +5° C.; continuously stretching the treated gelled fiber at least about 200% while it is in contact only with water heated to a temperature within the range of about 90° C. to about 100° C.; contacting the stretched, gelled fiber prior to drying with an aqueous composition containing an anti-static agent; and continuously drying the resulting gelled fiber by causing it to move in a helical path in contact with a surface at least a portion of which is heated to a temperature within the range of about 40° C. to about 200° C., the said gelled fiber being in contact with the said portion of the said heated surface for a period at least sufficient to dry it.

9. The method of producing a synthetic fiber from a soluble, thermoplastic product of polymerization of a polymerizable mass comprising mainly acrylonitrile, said method comprising extruding the said product in the form of a fiber from a water-coagulable solution of the said polymerization product dissolved in a concentrated aqueous solution of a water-soluble salt which yields highly hydrated ions in aqueous solution, and immediately after extrusion contacting the extruded mass with a liquid coagulant comprising water, said coagulant being at a temperature not exceeding +10° C., thereby to precipitate the said product from the said solution as a stretchable gel; stretching the said gel in the presence of moisture and at a temperature within the range of about 70° C. to about 110° C.; applying a liquid composition containing an anti-static agent to the stretched gel; and continuously drying the resulting gelled fiber while it is moving in a helical path.

10. The method of producing a synthetic fiber from a viscous, water-coagulable solution of a thermoplastic product of polymerization of a polymerizable mass comprising at least about 85% by weight of acrylonitrile, said polymerization product being dissolved in a concentrated aqueous solution of a water-soluble salt which yields highly hydrated ions in aqueous solution and said method comprising heating the said solution at an elevated temperature sufficiently high to reduce its viscosity; extruding the said solution while thus being heated in the form of a fiber; immediately after extrusion immersing the extruded fiber in a liquid coagulant comprising mainly water, said coagulant being at a temperature within the range of −15° C. to +10° C., thereby to obtain a gelled, stretchable fiber; stretching the gelled fiber while passing through water maintained at a temperature of 90° C. to 100° C.; applying an aqueous dispersion containing an anti-static agent to the stretched fiber in gel state; and continuously drying the resulting gelled fiber by causing it to move in a helical path in contact with a surface at least a portion of which is heated to a temperature sufficiently high to dry the said fiber.

11. The method of producing a synthetic fiber which comprises spinning a water-coagulable solution containing a thermoplastic product of polymerization of a polymerizable mass comprising at least about 85% by weight of acrylonitrile into a liquid coagulant comprising mainly water, said polymerization product having a molecular weight within the range of 15,000 to 300,000 as calculated from viscosity measurements using the Staudinger equation and being dissolved in a concentrated aqueous solution of a water-soluble salt which yields highly hydrated ions in aqueous solution, and said coagulant being at a temperature within the range of −15° C. to +10° C., whereby a spun, stretchable fiber in gel state is obtained; stretching the gelled fiber at least about 100% in the presence of moisture and at a temperature within the range of about 70° C. to about 110° C.; applying an aqueous dispersion containing an anti-static agent to the stretched fiber in gel state; and continuously drying the resulting gelled fiber by causing it to move in a helical path in contact with a surface at least a portion of which is heated to a temperature within the range of about 40° C. to about 200° C., the said gelled fiber being in contact with the said portion of the said heated surface for a period at least sufficient to dry it.

12. The method of producing a synthetic fiber which comprises spinning a water-coagulable solution of an acrylonitrile polymerization product containing in the molecules thereof an average of at least about 85% by weight of combined acrylonitrile, said polymerization product being dissolved in a concentrated aqueous solution of a water-soluble metallic salt which yields highly hydrated ions in aqueous solution, and said solution being spun into a spinning bath comprising mainly water and being maintained at a temperature not higher than +5° C., whereby a spun, stretchable fiber in gel state is obtained; stretching the gelled fiber at least about 200% while passing through a bath comprising mainly water and maintained at a temperature within the range of about 70° C. to about 100° C.; contacting the stretched fiber in gel state with a liquid composition comprising an anti-static agent; continuously drying advancing helices of the resulting gelled fiber, at least a portion of each helix being in contact with a smooth, heated surface, the temperature of the said surface, the portion of each helix which is in contact therewith, the duration of said contact and the number of helices in contact with the said heated surface being such that the said helices of gelled fiber are dried; and continuously collecting the dried fiber.

13. A method as in claim 12 wherein the acrylonitrile polymerization product is dissolved in a concentrated aqueous solution of sodium thiocyanate.

14. The method of producing a synthetic fiber which comprises heating a viscous, water-coagulable solution of a thermoplastic product of polymerization of a polymerizable mass comprising at least about 85% by weight of acrylonitrile at an elevated temperature sufficiently high to reduce its viscosity, said polymerization product being dissolved in a concentrated aqueous solution of calcium thiocyanate; extruding the solution while thus being heated in the form of a fiber; immediately after extrusion immersing the extruded fiber in a coagulating bath of water maintained at a temperature of about 0° C. to about +5° C., thereby to obtain a swollen fiber having considerable elasticity and toughness; elongating the swollen fiber at least about 100% while passing through water maintainer at a temperature of 90° C. to 100° C. thereby to obtain a fiber having increased strength and toughness and which shows orientation along the fiber axis; contacting the elongated, swollen fiber with an aqueous dispersion containing an anti-static agent; and continuously drying the resulting elongated fiber in wet, swollen state by causing it to move in a helical path in contact with a surface at least a portion of which is heated to a temperature sufficiently high to dry the said fiber.

15. The method of producing a synthetic fiber from a soluble, thermoplastic product of polymerization of a polymerizable mass comprising mainly acrylonitrile, said polymerization product being dissolved in a concentrated aqueous solution of a water-soluble salt which yields highly hydrated ions in aqueous solution and said method comprising continuously spinning a water-coagulable solution of the said polymerization product into a liquid coagulant comprising mainly water, said coagulant being at a temperature within the range of −15° C. to +10° C. whereby a spun, stretchable fiber in gel state is obtained; continuously stretching the gelled fiber at least about 100% while passing through water maintained at a temperature of about 70° C. to about 100° C.; continuously collecting the stretched gelled fiber; maintaining the stretched fiber in a gel state; contacting the stretched, gelled fiber prior to drying with an aqueous composition comprising an anti-static agent; and continuously drying the resulting gelled fiber by causing it to move in a helical path in contact with a rotating surface at least a portion of which is heated to a temperature within the range of about 50° C. to about 120° C., the said gelled fiber being in contact with the said portion of the said heated surface for a period at least sufficient to dry the fiber.

16. The method of producing a synthetic fiber from a soluble, thermoplastic product of polymerization of a polymerizable mass comprising mainly acrylonitrile, said polymerization product being dissolved in a concentrated aqueous solution of a water-soluble salt which yields highly hydrated ions in aqueous solution and said method comprising continuously spinning a water-coagulable solution of the said polymerization product into a liquid coagulant comprising mainly water, said coagulant being at a temperature within the range of −15° C. to +10° C. whereby a spun, stretchable fiber in gel state is obtained; continuously stretching the gelled fiber at least about 100% while passing through water maintained at a temperature of about 70° C. to about 100° C.; contacting the continuously moving, stretched gelled fiber with an aqueous composition comprising an anti-static agent; and continuously drying the resulting gelled fiber by causing it to move in a helical path in contact with a rotating surface at least a portion of which is heated to a temperature within the range of about 50° C. to about 120° C., the said gelled fiber being in contact with the said portion of the said heated surface for a period at least sufficient to dry the fiber.

17. The method of producing a synthetic fiber which comprises continuously spinning a water-coagulable solution of an acrylonitrile polymerization product containing in the molecules thereof an average of at least about 85% by weight of combined acrylonitrile, said polymerization product being dissolved in an concentrated aqueous solution of water-soluble metallic salt comprising a thiocyanate, said salt yielding highly hydrated ions in aqueous solution, and said solution being continuously spun into a spinning bath comprising mainly water and being maintained at a temperature not higher than +10° C. whereby a spun, stretchable fiber in gel state is obtained; continuously stretching the gelled fiber at least about 100% while passing through water maintained at a temperature of about 90° C. to about 100° C.; contacting the continuously moving, stretched, gelled fiber with an aqueous composition comprising an anti-static agent by causing it to move continuously through a bath of the same, said bath being maintained at a temperature of about 40° C. to about 70° C.; and continuously drying the resulting gelled fiber by causing it to move in a helical path in contact with a rotating surface at least a portion of which is heated to a temperature within the range of about 50° C. to about 120° C., the gelled fiber being in contact with the said portion of the said heated surface for a period at least sufficient to dry the fiber.

18. The method of producing a synthetic fiber which comprises continuously spinning a water-coagulable solution of an acrylonitrile polymerization product containing in the molecules thereof an average of at least about 85% by weight of combined acrylonitrile, said polymerization product being dissolved in a concentrated aqueous solution of a water-soluble metallic salt which yields highly hydrated ions in aqueous solution, and said solution being continuously spun into a spinning bath comprising mainly water and being maintained at a temperature not higher than +10° C. whereby a spun, stretchable fiber in gel state is obtained; continuously stretching the gelled fiber at least about 100% while passing through an aqueous bath comprising mainly water and containing, also, an anti-static agent, said bath being maintained at a temperature within the range of about 70° C. to about 100° C.; and continuously drying the resulting gelled fiber by causing it to move in a helical path in contact with a rotating surface at least a portion of which is heated to a temperature within the range of about 50° C. to about 120° C., the said gelled fiber being in contact with the said portion of the said heated surface for a period at least sufficient to dry the fiber.

19. The method of producing a synthetic fiber which comprises extruding, in the from of a fiber, a viscous water-coagulable solution of a thermoplastic product of polymerization of a polymerizable mass comprising at least 85% by weight of acrylonitrile, said polymerization product having a molecular weight within the range of 15,000 to 300,000 as calculated from viscosity measurements using the Staudinger equation, being dissolved in a concentrated aqueous solution of a water-soluble thiocyanate and constituting from 7 to 20% by weight of the said solution; immediately after extrusion immersing the extruded fiber in a liquid coagulant comprising water, said coagulant being at a temperature not higher than +10° C., thereby to precipitate the said polymerization product in the form of a stretchable, gelled fiber; stretching the said gelled fiber in the presence of moisture and at a temperature within the range of 70° C. to 110° C.; contacting the stretched, gelled fiber prior to drying with an aqueous composition containing an anti-static agent; and continuously drying advancing helices of the resulting gelled fiber, at least a portion of each helix being in contact with a rotating, heated surface, the temperature of the said surface, the portion of each helix which is in contact therewith, the duration of said contact and the number of helices in contact with the said heated surface being such that the said helices of gelled fiber are dried.

20. The method of producing a synthetic fiber which comprises heating a water-coagulable solution of a thermoplastic product of polymerization of a polymerizable mass comprising at least 85% by weight of acrylonitrile, said polymerization product having a molecular weight of 35,000 to 300,000 as calculated from viscosity measurements using the Staudinger equation and being dissolved in a concentrated aqueous solution of sodium thiocyanate, and the said water-coagulable solution of the said polymerization product having a viscosity within the range of from 10 seconds to 500 seconds as determined by measusing the time in seconds for a Monel metal ball having a diameter of 1/8 inch to fall through 20 cm. of the solution at 61° C.; extruding the water-coagulable solution of the said polymerization product, while thus being heated, in the form of a fiber; immediately after extrusion immersing the extruded fiber in an aqueous coagulating bath maintained at a temperature within the range of —15° C. to +10° C. thereby to precipitate the said polymerization product in the form of a stretchable, water-swollen fiber; stretching the said fiber not less than 100% while passing through water maintained at a temperature ranging between 70° C. and 100° C.; applying an aqueous composition containing an anti-static agent to continuously advancing helices of the stretched, gelled fiber; and continuously drying advancing helices of the resulting gelled fiber, at least a portion of each helix being in contact with a smooth, rotating, heated surface, the temperature of the said surface, the portion of each helix which is in contact therewith, the duration of said contact and the number of helices in contact with the said heated surface being such that the said helices of gelled fiber are dried.

21. The method of producing a synthetic fiber which comprises extruding, in the form of a fiber, a viscous water-coagulable solution of a thermoplastic product of polymerization of a polymerizable mass comprising not less than 85% by weight of acrylonitrile, said polymerization product being dissolved in a concentrated aqueous solution of a water-soluble thiocyanate and constituting from 7 to 20% by weight of the said solution, and the said water-coagulable solution of the said polymerization product having a viscosity within the range of from 10 seconds to 500 seconds, as determined by measuring the time in seconds for a Monel metal ball having a diameter of 1/8 inch to fall through 20 cm. of the solution at 61° C., and being heated to a temperature within the range of from 60° C. to 100° C. immediately prior to extrusion; immediately after extrusion immersing the extruded fiber in a liquid coagulating bath comprising water maintained at a temperature within the range of 0° C. to +5° C. thereby to precipitate the said polymerization product in the form of a stretchable, water-swollen fiber; stretching the said fiber not less than 200% while passing through water maintained at a temperature within the range of from 90° C. to 100° C.; applying an aqueous dispersion containing an anti-static agent to continuously advancing helices of the stretched, gelled fiber; and continuously drying the resulting gelled fiber by causing it to move in a helical path in contact with a smooth, rotating metallic surface heated to a temperature within the range of about 50° C. to about 120° C., the said gelled fiber being in contact with the said heated surface for a period at least sufficient to dry the fiber.

ARTHUR CRESSWELL.

REFERENCES CITED

The following references are of record in the file of this patent:

UNITED STATES PATENTS

| Number | Name | Date |
|---|---|---|
| 2,140,921 | Rein | Dec. 20, 1938 |
| 2,190,265 | Hubert | Feb. 13, 1940 |
| 2,285,552 | Alfthan | June 9, 1942 |
| 2,348,772 | Wiley | May 16, 1944 |
| 2,353,270 | Rugeley | July 11, 1944 |
| 2,404,717 | Houtz | July 23, 1946 |

OTHER REFERENCES

Ser. No. 715,003, Wulff (A. P. C.), published April 23, 1943.

Certificate of Correction

Patent No. 2,558,731 July 3, 1951

ARTHUR CRESSWELL

It is hereby certified that error appears in the printed specification of the above numbered patent requiring correction as follows:

Column 3, line 47, for "12 to 16" read *12 to 18*; column 12, line 67, after "temperature" insert the word *and*; column 21, line 53, for "amomnium" read *ammonium*; column 24, line 30, strike out the word "other"; column 27, line 2, for "resultig" read *resulting*; column 29, line 33, for "maintainer" read *maintained*; column 31, line 9, for "from" read *form*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*